Patented June 5, 1951

2,555,976

UNITED STATES PATENT OFFICE 2,555,976

OXIDATION OF DRYING AND SEMIDRYING OILS

Vincent J. Keenan, Ardmore, Pa., assignor to United States Rubber Company, New York, N. Y., a corporation of New Jersey No Drawing. Application March 30, 1950, Serial No. 153,001

13 Claims. (Cl. 260—406)

This invention relates to a novel method for promoting the oxidation of drying and semi-drying oils. In a particularly important aspect, the invention relates to a new method of blowing drying and semi-drying oils. In another aspect, it relates to a method of accelerating the curing of films, for example surface coatings, comprising drying or semi-drying oils.

The oxidation of drying and semi-drying oils and of compositions containing the same is of extreme importance in the surface-coating and allied industries. However such oxidation has presented various difficulties among which is the slowness of the oxidation. Blown drying and semi-drying oils are of particular importance because of their excellent wetting properties which promote wetting of pigments and of surfaces being coated. However, the widespread use of such blown oils is hindered by the expensive and time-consuming nature of their preparation and the undesirably dark color which frequently develops. Some improvement in color can be attained by carrying out the blowing operation at low temperatures, e. g., 75° to 125° C., although the reaction time is thereby prolonged to an economically undesirable degree. For these reasons, the use of such blown oils has been limited. My invention provides a new and greatly improved method of blowing oils which overcomes the foregoing difficulties.

In the utilization of drying and semi-drying oils, they are generally formulated into coating compositions which are then applied to the surface to be decorated or protected and allowed to dry or cure by contact with the air in known manner. Numerous efforts have been made to speed up the curing or drying of such coatings. For example, small amounts of driers may be incorporated in the formulations. In some cases the coated surface is exposed to actinic light to speed up the polymerization and oxidation of the coating materials. My invention provides a new way of accelerating the drying of or curing of such coatings.

I have now discovered that the oxidation of drying or semi-drying oils, whether in bulk or in extended form, as in a surface coating, can be greatly accelerated by carrying out the oxidation in the presence of ketene and diketene, in addition to the oxygen-containing gas which is normally used to effect the oxidation. By means of the present invention, the above-mentioned difficulties connected with the blowing and oxidation of drying and semi-drying oils can be obviated and the use of blown drying and semi-drying oils greatly extended. By means of my invention, the time required for oxidizing such oils is greatly reduced, particularly at temperatures ranging from 40° to 120° C. in which temperature range the reaction time was excessively long when following prior practice. Use of such temperatures is highly advantageous because discoloration of the oil is thereby minimized. My invention makes possible the oxidation of such oils at these low temperatures in economically feasible periods of time. Another advantage obtained by oxidizing oils in the presence of ketene or diketene is the fact that the oil undergoes little or no darkening in the treatment of my invention. Ketene and diketene are well-known chemicals. I may use them singly or in admixture. When ketene is employed, as a practical matter, it is necessary to generate it as used and pass it directly from the generator into the blowing or oxidizing step of my invention. The reason for this is that ketene rapidly polymerizes. Ketene is normally a gas (boiling at —41° C.). Diketene, on the other hand, is a liquid which can be stored and shipped and is a commercial chemical. Because of the ease with which diketene can be handled, I much prefer to employ it in the practice of my invention.

I have found that upon prolonged exposure to gaseous mixtures of oxygen and ketene or diketene, particularly at temperatures ranging from 20 to 180° C., the drying and semi-drying oils will gel. This method can be utilized to accelerate the curing of films or coatings containing such oils. The film or coating may be relatively thin as in the case where the oil-containing composition is applied by the usual coating methods such as brushing, dipping, etc., or the film may be quite thick as in the manufacture of linoleum.

In the practice of my invention, as it is typically carried out, the drying or semi-drying oil is exposed to the action of a gaseous mixture of ketene or diketene and oxygen at a temperature in the range from 20° to 180° C., preferably 40° to 120° C. It will be understood that the gaseous oxygen may be in the form of pure oxygen or in the form of oxygen-containing gases, most commonly air. Extreme care should be observed when temperatures in the upper portion of the range given (20–180° C.) are used, as the products, e. g., ketent peroxides, formed by the reaction of ketene and oxygen at such temperatures are highly explosive.

The amount of ketene or diketene employed may vary widely but, of course, should be sufficient to substantially accelerate the rate of oxidation of the oil. I have obtained satisfactory results using amounts ranging from as low as 0.3% to as high as 3% by weight based on the oil. The concentration of ketene or diketene in the gaseous mixture to which the oil is subjected in the normal practice of my invention may typically range from 5 to 50 mole per cent of ketene or diketene based on the sum of the oxygen and ketene or diketene.

The reaction time will vary with the temperature employed and with the relative proportions of ketene or diketene, oxygen and oil employed. The reaction time will also depend upon the degree of oxidation or extent of gelling desired. Treatment for as little as one or two hours will suffice to effect a very significant oxidation of the oil and further oxidation can be readily obtained by continuing the treatment. When surfaces comprising the oil, particularly exemplified by surface coatings are being oxidized by my invention, it is preferred to body the oil by subjecting the oxidized film to elevated temperatures until gelling has occurred. When gelling of such surfaces takes place, they are usually hardened or set so that they are no longer unduly soft or tacky at normal temperatures.

Any method of treatment which effects the desired intimacy of contact between the oil or oil-containing composition, the ketene or diketene and the oxygen-containing gas may be employed. When treating a mass of oil, I often prefer to bubble a gaseous mixture of the ketene or diketene and oxygen through the oil until the desired degree of oxidation has been effected.

The preferred method of treatment involves passing the oxygen-containing gas through a body of liquid ketene or diketene whereby a portion of the ketene or diketene is volatilized and thereby imparted to the gas, and passing the resulting gaseous mixture containing the ketene or diketene in amount effective to substantially accelerate the oxidation of the oil, into contact with the oil.

In the case of diketene, which is normally a liquid, I can add it incrementally or continuously to the body of the oil while the oxygen-containing gas is passed therethrough, as by bubbling. Where incremental addition is employed, the smaller the increments and the more frequent their addition, the more uniformly does the reaction proceed. It will be understood that because of the volatility of the diketene it will be continuously removed from the body of oil by vaporization into the effluent gas leaving the body of oil and that therefore it will be necessary to add diketene periodically or continuously during the blowing step in order that diketene be present in the body of the oil in an amount effective to accelerate substantially the oxidation of the oil.

The body of the oil should be vigorously agitated during the blowing step to promote intimate contact and rapid oxidation. In many cases the bubbling of the oxygen-containing gas through the body of the oil will provide sufficient agitation. Where this is not the case, mechanical agitation of the oil can be provided.

Following oxidation of the oil in the presence of ketene or diketene by my invention, it is often preferred to subject the oxidized oil to heat treatment at a suitable elevated temperature under reduced pressure for the purpose of removing any residual volatile material, such as acetic acid, formed therein during the blowing operation. Such volatile material may be absent if the blowing operation is carried out at a sufficiently high temperature, e. g., at 125° to 180° C.

Following oxidation, I often prefer to heat treat the oxidized oil of my invention at a suitable elevated temperature to increase the viscosity or polymerize the oil to any desired extent. This heat bodying step can be combined with the step of removing the volatiles, just described. The heat bodying is preferably conducted at temperatures ranging from 60° C. to 125° C. The previous oxidation of the oil by my invention accelerates the rate of heat bodying of the oil.

When treating films or surfaces coated with the oil, or, more usually, with an oil-containing composition, I simply expose the film or coated surface to an atmosphere, static or moving, of the gaseous mixture of oxygen and ketene or diketene until the desired degree of hardening or setting has been achieved.

In some cases the oil may be treated successively with ketene or diketene and gaseous oxygen. For example, the oil may be exposed first to ketene or diketene, then to oxygen, again to ketene or diketene, and so on, until the desired oxidation has been effected. In such case, the ketene or diketene added during the ketene or diketene part of the cycle is effective during the oxygen part of the cycle.

In some cases, particularly in the treatment of the more reactive oils such as linseed oil, it may be desirable to cool the oil during the treatment to prevent the temperature from rising excessively due to the exothermic heat of the reaction. For example when blowing a body of an oil like linseed oil in accordance with my invention it is often desirable to keep the temperature of the reaction body within the limits of 40° to 120° C. It will be understood that cooling should be so limited that the reaction temperature is moderately elevated, preferably 40° C. or higher in order that the oxidation may proceed at a sufficiently rapid rate.

Oils which have been blown by the process of my invention can be employed in conjunction with solvents, pigments, resins and driers in the formulation of varnishes, paints, enamels and other coating or impregnating compositions.

Any drying or semi-drying oil may be oxidized by the method of the present invention. Examples are linseed oil, China-wood oil, perilla oil, oiticica oil, soya bean oil, poppy oil, sunflower oil, safflower oil, menhaden oil, cottonseed oil, dehydrated castor oil, etc. The oils treated are almost invariably the triglycerides of unsaturated fatty acids. The treatment of my invention is generally applied to the raw oils. I prefer to apply my invention to drying oils which, as is well-known, are oils having an iodine number above 130. Less preferably my invention may be applied to semi-drying oils which are oils having an iodine number of from 100 to 130. Oils having an iodine number below 100 may be considered as belonging to the non-drying class and are not affected by oxidation in the presence of ketene or diketene. Generally speaking, the higher the iodine number of the oil treated by my invention the more effective the acceleration of oxidation by ketene or diketene.

By my invention, one can easily prepare a blown oil as heavy (viscous) as commercial oxidized oils, about the same or lighter in color, having higher peroxide concentrations and requiring much shorter oxygen treatment than commercially blown oils.

The following examples disclose my invention in more detail.

Example 1

(a) Gaseous oxygen at ca. 25° C. is passed through a reservoir of liquid ketene (at −55° C.) at an approximate rate of 240 ml./minute and the resultant gaseous mixture is bubbled through about 316 g. of commercial raw linseed oil at ca. 45° C. with vigorous agitation. After about 15 minutes an exothermic reaction occurs and the reaction mixture is maintained at 45–50° C. by judicious cooling while the flow of the gas mixture is continued. A flowmeter attached to the exit vent of the reaction vessel indicates that approximately one half of the entering oxygen is absorbed by the oil.

At the end of two hours, approximately 0.55 mole of oxygen has been absorbed and the reaction is discontinued. The product amounts to about 348 g. and has an absolute viscosity of ca. 3.40 poises at 25° C., which corresponds to "M" on the Gardner scale. The color is a somewhat lighter yellow than that of the starting material. A film of the blown oil spread on a glass plate is cured within 4 hours at 60–70° C.

(b) Upon repetition of the above blowing process in the absence of ketene no appreciable quantity of oxygen is absorbed in 2 hours and the product shows little increase in viscosity (0.50 poise at 25° C.; "A" on the Gardner scale).

I have found that the exposure of a surface coating containing a drying or semi-drying oil to a gaseous atmosphere containing ketene or diketene is an excellent short-cut method of determining the effectiveness of treatment with oxygen and ketene or diketene. The results obtained by this short-cut method are directly comparable with the results obtained by the longer and more expensive procedure of blowing a body of the oil with a gas-containing oxygen and ketene and diketene. The short-cut method, which is exemplified in Examples 3 and 4, provides an easy rapid method of comparing the behavior of a variety of drying and semi-drying oils when subjected to the action of oxygen and either ketene or diketene, since it is possible to merely coat surfaces, such as glass slides, with the various oils or oil-containing compositions and then expose to the oxygen-ketene or oxygen-diketene atmosphere.

Example 2

This illustrates the utility of our process in accelerating the curing of drying-oil films.

A film of raw linseed oil is spread on a microscope glass slide and enclosed in a 500 ml. tube under an atmosphere comprising a 50:50 (by volume) mixture of ketene and oxygen. After standing overnight (ca. 18 hours) at 25° C. the tube and its contents are heated for 1 hour at 60° C. Upon examination of the oil film it was found to have cured to a hard, solvent-resistant state.

A second film treated in the above manner but in the absence of ketene was found to be still oily, free-flowing and ungelled, indicating lack of cure.

Example 3

The following drying and semi-drying oils were treated with ketene and oxygen in accordance with the procedure set forth in Example 2. These experiments were continued only until it became evident that the oil had been significantly changed as a result of the presence of the ketene. Controls were also run using oxygen without the ketene. The results are tabulated below.

| Oil | Ketene and Oxygen | Oxygen |
|---|---|---|
| China wood | gelled, firm tough film | Gelled, soft film. |
| Menhaden | gelled, tacky film | Gelled, much softer and more tacky than with ketene. |
| Soya bean | liquid, slightly tacky | Liquid, unchanged. |
| Corn | do | Liquid, apparently unchanged. |

Example 4

Gaseous oxygen at 25° C. is bubbled through 100 gms. of alkali-refined raw linseed oil to which 5 ml. of ketene dimer (diketene) have been added. The temperature of the oil is 99° C.. The oil is stirred rapidly throughout the experiment and the oxygen is bubbled in at an approximate rate of 32 liters/hour. After 1½ hours, an exothermic reaction occurs. The reaction mixture is maintained at 90°–100° C. About ½ hour after the exothermic reaction occurs, another 5 ml. of ketene dimer is added to the oil. Approximately one-half of the entering oxygen is absorbed by the oil during the treatment.

At the end of 3½ hours, at which time the absorption of oxygen has dropped substantially below 50%, the reaction is discontinued. The blown oil has increased in weight by 4 grams. It is now heated under reduced pressure (ca. 5 mm. Hg) at 100° C. for 3–4 hours. This heat-treatment removes volatile by-products, such as acetic acid, formed during the reaction, and also serves to increase the viscosity of the oil. The viscosity of the product measured in a Gardner-Holt viscosity tube is found to be ca. 160 poises. Its color is between 7 and 8 as measured by the Gardner (1933) scale.

Example 5

Gaseous oxygen at 25° C. is passed through a reservoir of diketene (at 25° C.) at an approximate rate of 17 liters/hour, and the resultant gaseous mixture is bubbled through 378 gms. of commercial raw linseed oil at 177° C. with vigorous agitation.

After one hour and forty minutes, a total of 1.2 ml. of diketene has been swept into the reaction flask by oxygen. The reaction is discontinued. The product has a viscosity of ca. 72 poises and a Gardner scale (1933) color of 18. The acid value is 3.5.

The temperature used in this experiment represents about the practical upper limit which can be used in the practice of my invention. This is because of the rapid darkening and thickening of the oil at this temperature.

Example 6

250 gr. raw linseed oil were treated with approximately equimolecular proportions of ketene and oxygen in a flask equipped with a high speed stirrer. The oil was heated to 100° C. and the ketene oxygen mixture was passed in at such a rate as to just maintain this temperature (95–100° C.) with tap water cooling. The reaction mixture darkened at first during an induction period of about one hour, then lightened in color as the reaction started. The reaction was continued until the oxygen absorption decreased markedly as indicated by a flowmeter. 2.75 hours were required to carry the oxidation to the extent indicated. The product weighed 313 grams.

The initial oil had a Gardner viscosity of 1.4 poises (at 25° C.) and a Gardner (1933) scale color of 3. The product had a Gardner viscosity of 17.6 poises (at 25° C.). The amount of peroxide formed was found to be 1.39 millimoles per gram of the oil.

The product was heated under the vacuum to 85° C. in order to strip off the acetic acid and other by-products formed during blowing. A portion of this refined oxidized oil was heated in vacuum to a temperature of 100° C. for ½ hour. The viscosity was thereby raised to 85 poises at ca. 25° C. The color was 5 by the Gardner (1933) scale. A second portion of the refined oxidized oil was heated for 5 hours at 70° C. yielding a product with a viscosity of ca. 225 poises and a Gardner color of 6. A total of 8 hours at 70° C. increased the viscosity to ca. 266 poises and the color to 7.

A film spread with the oil having a viscosity of 266 poises dried to a tacky state in 48 hours. The addition thereto of 0.05% $Mn^{++}$ (manganese napthenate) as an oil soluble salt caused by a dry skin to form in less than 24 hours.

*Example 7*

Three hundred grams of raw linseed oil were oxidized in the same manner as in Example 6, i. e., ketene and oxygen were passed into the oil during high speed stirring, at 95–100° C. except that gaseous ketene was passed into the oil derectly instead of passing the oxygen through the ketene and then passing the resulting mixture into the oil as previously done. Acetone, diketene and decomposition products were present as well as ketene. After the induction period (1 hour) 0.17 mole ketene and 0.46 mole oxygen were introduced. The reaction was allowed to proceed for 45 minutes. The product (315 g.) contained 1.55 millimole peroxide per gram.

The following tests on the product were run: (a) Heating at 100° C. for 24 hours increased the viscosity only slightly. (b) Rapid heating to 300° C. caused peroxide decomposition (gas evolution) at 150°–200° C. but only a slight increase in viscosity. (c) Manganese and cobalt, 0.05% each as oil soluble salts, caused films to dry hard in 8 and 3 hours respectively.

Apparently the use of ketene direct from the generator introduces some polymerization inhibitor, as indicated by the failure of the product to increase in viscosity during heat treatment. This inhibitor does not prevent the oxidation of the oil.

Having thus described my invention, what I claim and desire to protect by Letters Patent is:

1. The method which comprises contacting an oil selected from the class consisting of drying and semi-drying oils with an oxygen-containing gas in the presence of a material selected from the group consisting of ketene, diketene and mixtures thereof and thereby effecting accelerated oxidation of said oil.

2. The method of claim 1 wherein said contacting is effected at a temperature of from 20° to 180° C.

3. The method of claim 1 wherein said contacting is effected at a temperature of from 40° to 120° C.

4. The method which comprises contacting an oil selected from the class consisting of drying and semi-drying oils with an oxygen-containing gas in the presence of a material selected from the group consisting of ketene, diketene and mixtures thereof and thereby effecting accelerated oxidation of said oil, and subsequently heating the oil at an elevated temperature to increase its viscosity.

5. The method which comprises contacting an oil selected from the class consisting of drying and semi-drying oils with an oxygen-containing gas in the presence of ketene and thereby effecting accelerated oxidation of said oil.

6. The method of claim 5 wherein said contacting is effected while said oil is at a temperature of from 40° to 120° C. and is subjected to vigorous mechanical agitation.

7. The method which comprises passing an oxygen-containing gas through a body of liquid ketene, and contacting the resulting gaseous mixture of ketene and said gas with an oil selected from the class consisting of drying and semi-drying oils and thereby effecting accelerated oxidation of said oil.

8. The method which comprises contacting an oil selected from the class consisting of drying and semi-drying oils with an oxygen-containing gas in the presence of diketene and thereby effecting accelerated oxidation of said oil.

9. The method of claim 8 wherein said contacting is effected while said oil is at a temperature of from 40° to 120° C. and is subjected to vigorous mechanical agitation.

10. The method which comprises passing an oxygen-containing gas through a body of liquid diketene, and contacting the resulting gaseous mixture of diketene and said gas with an oil selected from the class consisting of drying and semi-drying oils and thereby effecting accelerated oxidation of said oil.

11. The method which comprises contacting a drying oil with an oxygen-containing gas in the presence of a material selected from the class consisting of ketene, diketene, and mixtures thereof and thereby effecting accelerated oxidation of said oil.

12. The method which comprises contacting linseed oil with an oxygen-containing gas in the presence of a material selected from the class consisting of ketene, diketene, and mixtures thereof and thereby effecting accelerated oxidation of said oil.

13. The method of accelerating the curing of a film comprising an oil selected from the group consisting of drying and semi-drying oils which comprises exposing said film to the action of a gaseous mixture of oxygen and a material selected from the class consisting of ketene and diketene.

VINCENT J. KEENAN.

No references cited.